US009751273B2

(12) United States Patent
Selle et al.

(10) Patent No.: US 9,751,273 B2
(45) Date of Patent: *Sep. 5, 2017

(54) METHOD AND APPARATUS FOR MAKING BAGS

(75) Inventors: Paul A. Selle, Appleton, WI (US); Kenneth C. Radtke, Appleton, WI (US); Charles H. Sauder, Appleton, WI (US); Paul A. Johnson, Menasha, WI (US); Christopher Lee White, Watersmeet, MI (US); Arvid R. Johnson, Appleton, WI (US); Gregory T. Prellwitz, Black Creek, WI (US); Michael J. Stickney, Appleton, WI (US); Thomas C. Jansen, Appleton, WI (US); Christopher A. Saucier, Yarmouth Port, MA (US); Terry L. Leitzke, Hortonville, WI (US); Bradley J. Schmoll, Appleton, WI (US)

(73) Assignee: CMD Corporation, Appleton, WI (US)

( * ) Notice: Subject to any disclaimer, the term of this patent is extended or adjusted under 35 U.S.C. 154(b) by 200 days.

This patent is subject to a terminal disclaimer.

(21) Appl. No.: 12/159,979

(22) PCT Filed: Jan. 12, 2007

(86) PCT No.: PCT/US2007/000981
§ 371 (c)(1),
(2), (4) Date: Jul. 2, 2008

(87) PCT Pub. No.: WO2007/084430
PCT Pub. Date: Jul. 26, 2007

(65) Prior Publication Data
US 2008/0312056 A1 Dec. 18, 2008

Related U.S. Application Data
(63) Continuation-in-part of application No. 11/331,466, filed on Jan. 13, 2006, now Pat. No. 7,445,590.

(51) Int. Cl.
B31B 27/14 (2006.01)
B31B 19/14 (2006.01)
(Continued)

(52) U.S. Cl.
CPC .............. *B31B 19/14* (2013.01); *B29C 65/10* (2013.01); *B29C 65/14* (2013.01);
(Continued)

(58) Field of Classification Search
CPC .. B31B 19/14; B31B 1/10; B31B 1/74; B31B 27/00; B31B 29/00; B31B 2201/61;
(Continued)

(56) References Cited

U.S. PATENT DOCUMENTS 2,248,471 A 7/1941 Stroop
2,420,983 A 5/1947 Salfisberg
(Continued)

FOREIGN PATENT DOCUMENTS

AU 2007207686 2/2012
EP 0375196 6/1990
WO PCT/US07/00981 1/2007

*Primary Examiner* — Sameh Tawfik
(74) *Attorney, Agent, or Firm* — George R. Corrigan

(57) ABSTRACT

A machine and method for making bags is described and includes a web, traveling from an input section to a rotary drum, to an output section. The rotary drum includes at least one seal bar, having a first sealing zone, and an adjacent weakening zone. The weakening zone may be a heated perforator, includes a heating wire, or be disposed to create an auxiliary sealed area. The heating wire can have, connected thereto, a source of power that is at an adjustable voltage or magnitude, and/or pulsed, and/or a feedback loop. The heating wire may be an NiCr wire and make intermittent contact with the web and be disposed in an insert. The weakening zone may create a line of weakness that is uniform or varies in intensity, is a separating zone, or
(Continued)

includes a heat film, a toothed blade, a row of pins, a source of air, or a source of vacuum. The sealing zones may include temperature zones, cartridge heaters, cooling air, or heated air, or a source of ultrasonic, microwave or radiative energy.

21 Claims, 12 Drawing Sheets

(51) Int. Cl.

| | |
|---|---|
| B29C 65/10 | (2006.01) |
| B29C 65/14 | (2006.01) |
| B29C 65/16 | (2006.01) |
| B29C 65/18 | (2006.01) |
| B29C 65/38 | (2006.01) |
| B29C 65/74 | (2006.01) |
| B31B 1/74 | (2006.01) |
| B31B 27/00 | (2006.01) |
| B29C 65/30 | (2006.01) |
| B29C 65/22 | (2006.01) |
| B31B 1/10 | (2006.01) |
| B31B 29/00 | (2006.01) |
| B29C 65/00 | (2006.01) |
| B29C 35/08 | (2006.01) |
| B29K 23/00 | (2006.01) |
| B29C 65/78 | (2006.01) |
| B29L 31/00 | (2006.01) |

(52) U.S. Cl.
CPC ...... *B29C 65/1412* (2013.01); *B29C 65/1467* (2013.01); *B29C 65/16* (2013.01); *B29C 65/18* (2013.01); *B29C 65/222* (2013.01); *B29C 65/229* (2013.01); *B29C 65/305* (2013.01); *B29C 65/38* (2013.01); *B29C 65/7412* (2013.01); *B29C 65/7433* (2013.01); *B29C 65/7437* (2013.01); *B29C 65/7451* (2013.01); *B29C 65/7453* (2013.01); *B29C 65/7457* (2013.01); *B29C 66/1122* (2013.01); *B29C 66/232* (2013.01); *B29C 66/3472* (2013.01); *B29C 66/43* (2013.01); *B29C 66/7352* (2013.01); *B29C 66/80* (2013.01); *B29C 66/818* (2013.01); *B29C 66/8122* (2013.01); *B29C 66/81267* (2013.01); *B29C 66/81427* (2013.01); *B29C 66/81431* (2013.01); *B29C 66/81812* (2013.01); *B29C 66/83417* (2013.01); *B29C 66/83433* (2013.01); *B29C 66/83511* (2013.01); *B29C 66/8511* (2013.01); *B29C 66/91212* (2013.01); *B29C 66/91231* (2013.01); *B29C 66/91421* (2013.01); *B29C 66/91651* (2013.01); *B29C 66/91653* (2013.01); *B31B 1/10* (2013.01); *B31B 1/74* (2013.01); *B31B 27/00* (2013.01); *B29C 65/1425* (2013.01); *B29C 65/1496* (2013.01); *B29C 65/1696* (2013.01); *B29C 65/7847* (2013.01); *B29C 66/0042* (2013.01); *B29C 66/348* (2013.01); *B29C 66/349* (2013.01); *B29C 66/71* (2013.01); *B29C 66/81241* (2013.01); *B29C 66/81262* (2013.01); *B29C 66/81264* (2013.01); *B29C 66/81417* (2013.01); *B29C 66/81419* (2013.01); *B29C 66/83517* (2013.01); *B29C 66/919* (2013.01); *B29C 66/91315* (2013.01); *B29C 66/91423* (2013.01); *B29C 66/91431* (2013.01); *B29C 66/91631* (2013.01); *B29C 66/91641* (2013.01); *B29C 66/939* (2013.01); *B29C 66/93451* (2013.01); *B29C 66/949* (2013.01); *B29C 66/961* (2013.01); *B29C 66/962* (2013.01); *B29C 2035/0822* (2013.01); *B29C 2793/0045* (2013.01); *B29K 2023/0625* (2013.01); *B29K 2905/02* (2013.01); *B29K 2995/007* (2013.01); *B29L 2031/7128* (2013.01); *B31B 29/00* (2013.01); *B31B 2201/61* (2013.01); *B31B 2219/028* (2013.01); *B31B 2219/14* (2013.01); *B31B 2219/924* (2013.01); *B31B 2237/10* (2013.01); *B31B 2237/60* (2013.01); *Y10T 83/0414* (2015.04); *Y10T 83/293* (2015.04); *Y10T 83/9292* (2015.04); *Y10T 83/9408* (2015.04); *Y10T 156/1054* (2015.01); *Y10T 156/1313* (2015.01)

(58) Field of Classification Search
CPC .......... B31B 2219/14; B31B 2219/924; B31B 2237/10; B31B 2237/60; B29C 65/10; B29C 65/1412; B29C 65/1467; B29C 65/16; B29C 65/305; B29C 65/7437; B29C 66/232; B29C 66/3472; B29C 66/8122; B29C 66/80; B29C 66/818; B29C 66/83417; B29C 66/91231; B29C 66/91651; Y10T 156/1054; Y10T 156/1313; Y10T 83/0141; Y10T 83/293
USPC ....... 493/200, 230, 223, 233, 235, 236, 238, 493/239
See application file for complete search history.

(56) References Cited

U.S. PATENT DOCUMENTS

| | | | |
|---|---|---|---|
| 3,030,750 | A | 4/1962 | Lowe et al. |
| 3,054,441 | A * | 9/1962 | Bart et al. ................. 156/515 |
| 3,300,365 | A | 1/1967 | Roos |
| 3,580,142 | A * | 5/1971 | Stock et al. ................ 493/35 |
| 3,933,563 | A | 1/1976 | Carlisle |
| 4,017,351 | A | 4/1977 | Larson et al. |
| 4,098,159 | A * | 7/1978 | Rothfuss .................... 83/171 |
| 4,114,520 | A * | 9/1978 | Achelpohl et al. ........... 493/11 |
| 4,567,984 | A | 2/1986 | Gietman, Jr. |
| 4,632,667 | A | 12/1986 | McDonald et al. |
| 4,642,084 | A | 2/1987 | Geitman |
| 4,867,735 | A | 9/1989 | Wogelius |
| 4,889,522 | A | 12/1989 | Geitman, Jr. |
| 4,934,993 | A | 6/1990 | Geitman |
| 4,976,673 | A | 12/1990 | Smith et al. |
| 4,991,376 | A | 2/1991 | Backman |
| 5,094,657 | A * | 3/1992 | Dworak et al. ............. 493/208 |
| 5,209,800 | A | 5/1993 | Spencer et al. |
| 5,308,666 | A | 5/1994 | Borchardt |
| 5,318,237 | A | 6/1994 | Lotto et al. |
| 5,377,929 | A | 1/1995 | Gietman, Jr. et al. |
| 5,417,035 | A | 5/1995 | English |
| 5,417,638 | A | 5/1995 | Anderson et al. |
| 5,447,486 | A | 9/1995 | Anderson et al. |
| 5,518,559 | A | 5/1996 | Saindon et al. |
| 5,587,032 | A | 12/1996 | Saindon et al. |
| 5,611,627 | A | 3/1997 | Belias et al. |
| 5,683,340 | A | 11/1997 | Belias et al. |
| 5,830,117 | A | 11/1998 | Anderson |
| 5,967,663 | A | 10/1999 | Vaquero et al. |
| 6,059,458 | A | 5/2000 | Belias et al. |
| 6,059,707 | A | 5/2000 | Belias et al. |
| 6,089,753 | A | 7/2000 | Belias et al. |
| 6,117,058 | A | 9/2000 | Sauder et al. |
| 6,139,479 | A * | 10/2000 | Heiliger ..................... 493/22 |
| 6,186,436 | B1 | 2/2001 | Selle et al. |
| 6,364,241 | B1 | 4/2002 | Bartels |
| 6,565,946 | B2 * | 5/2003 | Perkins et al. ............. 428/166 |
| 6,635,139 | B2 * | 10/2003 | Bohn et al. ................ 156/251 |
| 6,648,044 | B2 * | 11/2003 | Bohn et al. ................ 156/515 |
| 6,746,389 | B2 | 6/2004 | Selle et al. |
| 6,951,996 | B2 * | 10/2005 | Timans et al. ............. 219/390 |

(56) References Cited

U.S. PATENT DOCUMENTS

| | | |
|---|---|---|
| 7,445,590 B2 * | 11/2008 | Selle et al. .................... 493/200 |
| 7,992,505 B2 * | 8/2011 | Ecker ............................ 112/291 |
| 8,012,076 B2 * | 9/2011 | Selle et al. .................... 493/341 |
| 8,029,428 B2 * | 10/2011 | Selle et al. .................... 493/194 |
| 8,257,236 B2 * | 9/2012 | Selle et al. .................... 493/341 |
| 2007/0068632 A1 | 3/2007 | Bertram et al. |
| 2007/0167304 A1 | 7/2007 | Selle et al. |

\* cited by examiner

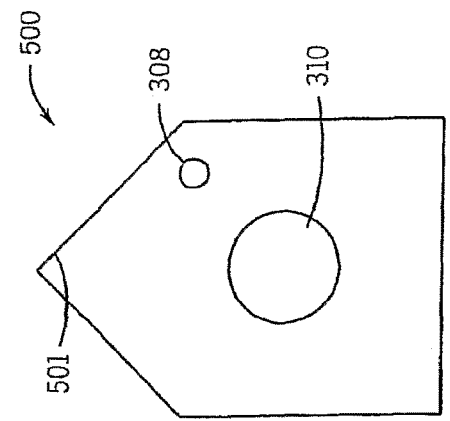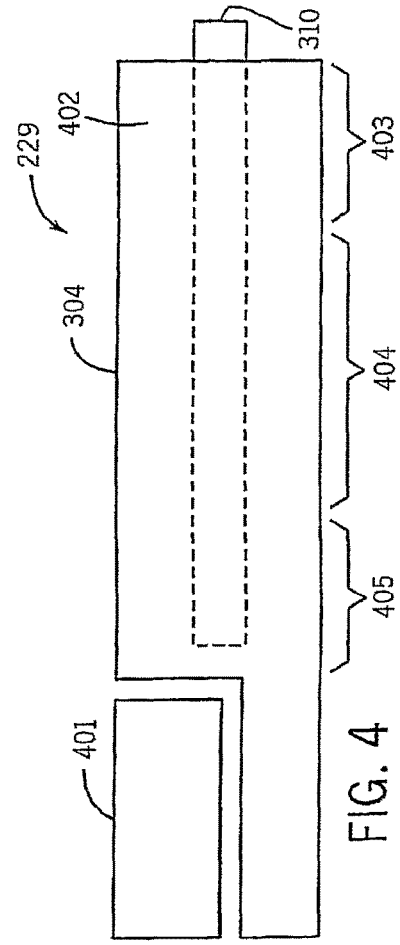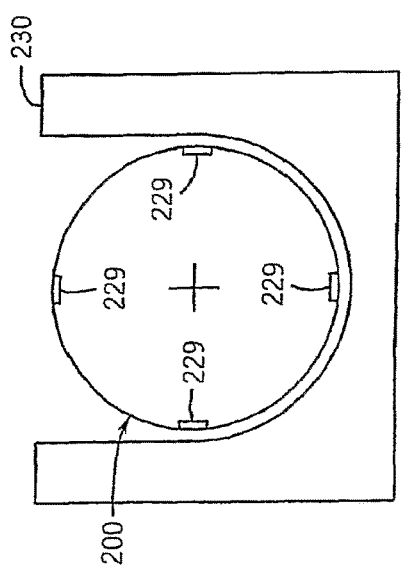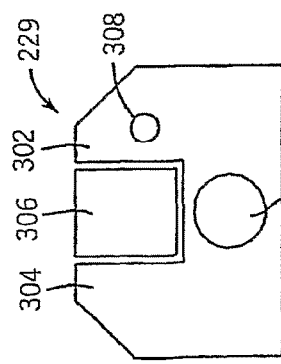

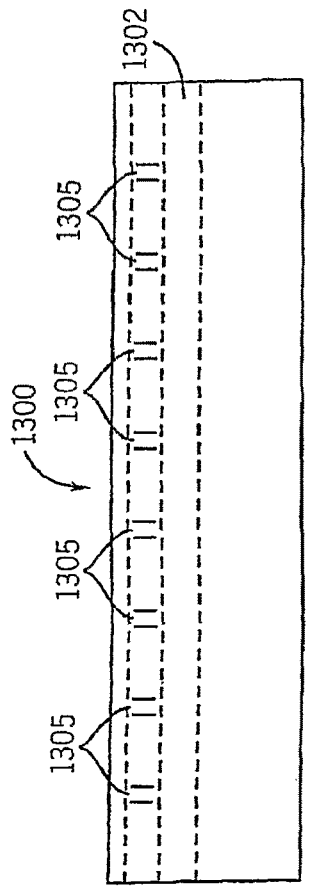
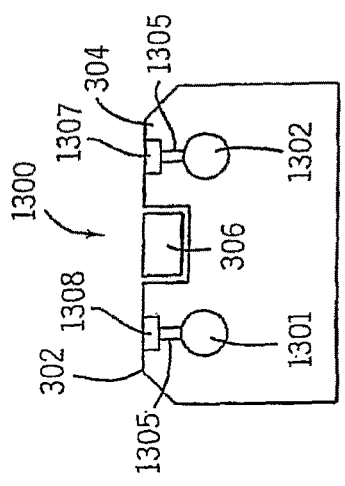
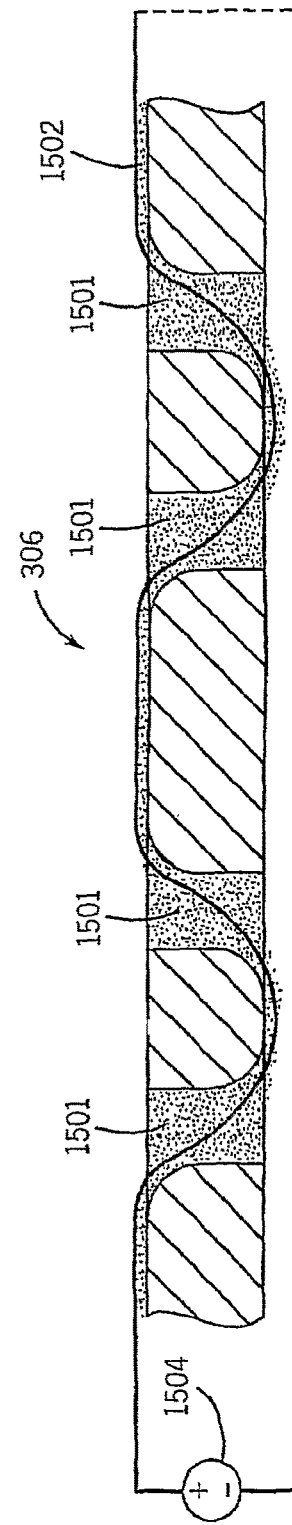

METHOD AND APPARATUS FOR MAKING BAGS

FIELD OF THE INVENTION

The present invention relates generally to the art of bag making. More specifically, it relates to bag making machines and a bag making method that create bags from a film or web and form seals and perforations or a line of weakness separating adjoining bags made from the web.

BACKGROUND OF THE INVENTION

There are many know bag machines. One style is a rotary drum machine. Rotary drum machines are well known, and a detailed description may be found in U.S. Pat. Nos. 6,117,058, 4,934,993, 5,518,559, 5,587,032 and 4,642,084 (each of which is hereby incorporated by reference).

A detailed description of the operation of rotary bag machines may be found in the patents above, but their general operation may be see with respect to FIG. 1. A prior art rotary bag machine 100 continuously processes a web 201 using a dancer assembly 203, a pair of drum-in rolls 205 and 206 (203-206 are part of an input section), a sealing drum 208, a pair of drum-out rolls 210 and 211, a sealing blanket 213, a pair of knife-in rolls 215 and 216, a knife 218 (which could be any other web processing device such as a perforator, knife, die cutter, punching station, or folding station), a pair of knife-out rolls 219 and 220 (210-220 are part of an output section), and a controller 221. Input section, as used herein, includes the portion of a bag machine where the web is received, such as an unwind and a dancer assembly. Output section, as used herein, includes assemblies that act on a web downstream of the seals being formed, such as perforators, winders, folders, etc.

The web is provided through dancer assembly 203 to drum 208. Drum 208 includes a plurality of seal bars 209. The seals bars are heated and create the seals forming the bags from web 201. Web 201 is held against drum 208 (and the seals bars) by a Teflon® coated blanket. The distance between seals created by the drum is related to the bag length (for bags formed end to end) or the bag width (for bags formed by making side seals). End to end bags are formed with one seal from the drum, and side to side bags are formed with a pair of seals. The drum diameter may be adjusted and/or less than all of the seal bars turned on to determine the distance between seals, and hence bag size.

Generally, rotary motion machines registers a downstream rotary knife to perforate between two seals, or beside a seal. Variations due to tension, film gauge variation, machine variations etc., occasionally causes seals to get cut off.

The prior art of FIG. 1 provides that after web 201 leaves drum 208 it is directed to rotary knife 218, which creates a perforation between bags, or could separate adjoining bags. When the bags are end to end bags the perforation is placed close to the single seal such that when the bags are separated, the perforation and the perforated end is the top of one bag, and the seal is the bottom of the adjoining bag. Ideally, the perforation is close to the seal to reduce waste, although this is difficult in practice. When bags are formed side to side, the perforation is made between the pair of seals. A seal is needed on both sides of the perforation, since the side of both bags should be sealed: The web between the pair of seals is wasted. Thus, the pair of seals should be close to one another to reduce waste, although this is also difficult in practice.

Controller 221 is connected to the various components to control speed, position, etc. Sensors may be used to sense print on the web to form the seals and/or register the perforation (place it in the correct location with respect) to the seal. Also, sensors may detect seals to try and create the perforation in the correct location. Sensing the seal has proven to be difficult. One prior art example of a system that sensed seals is described in U.S. Pat. No. 6,792,807, hereby incorporated by reference. If the perforation is placed too close to one side seal, then the seal may be cut off, rendering the bag useless.

Because sensing the seal is difficult, much waste is generated in bag making, or bags are ruined. The wasted web, (i.e. the web between a seal and the adjacent perforation), or the web used to make the ruined bag, can be very costly, particularly for high speed bag machines where the number of bags made per hour is great.

Another problem of prior art machines is that perforations may be skewed with respect to the seals, because the perforations are created downstream, and the web can wander or stretch. Also, a mechanical perforation knife must be adjusted every few days to continue to perform properly. Generally, sharp mechanical knives cannot be adjusted to change the perforation strength, and they can be costly, complex, and difficult to use.

Other type of bag machines, such as intermittent motion machines (not rotary drum machines) use burn off seals to seal and cut or perforate at the same time but speed is limited to about 300 fpm due to the reciprocating motion, dwell time, and difficulty handling the loose bags. Other intermittent motion machines, such as the CMD Icon, have seal bars with an integral toothed blade. The CMD CM300 machine has oscillating motion to move seal bars that have an integral toothed blade. Generally, intermittent motion machines are not as fast as rotary drum continuous machines, and thus produce far fewer bags per machine hour.

Accordingly, a method and machine for making bags that enhances the ability to locate the perforations close to the seals is desirable. Preferably this can be done without a downstream knife, to avoid problems associated therewith. Also, this is preferably done on a continuous motion machine, to avoid the slowness and difficulties associate with intermittent machines.

SUMMARY OF THE PRESENT INVENTION

A bag machine, according to a first aspect of the invention, includes an input section, a rotary drum, and an output section, wherein a web travels from the input section, to the rotary drum, to the output section. The rotary drum includes at least one seal bar which has a first sealing zone and a weakening zone adjacent the first sealing zone.

The weakening zone is a heated perforator, and/or includes a heating wire, and/or disposed to create an auxiliary sealed area adjacent a perforation, according to various embodiments.

The heating wire has, connected thereto, a source of power that is at an adjustable voltage or magnitude, and/or pulsed, and/or a feedback loop is provided in other embodiments.

The heating wire is a nickel chromium resistance wire, preferably about 80% nickel and about 20% chromium, and/or disposed to be make intermittent contact with the web, and/or has a resistance of about 4 ohms/ft, and/or disposed in an insert inserted between the sealing zones in various embodiments.

The insert is comprised of glass mica and/or has a plurality of holes disposed along a line in the cross direction in other embodiments.

The weakening zone is disposed to create a line of weakness that varies in intensity, and/or is a separating zone, and/or includes a heat film, and/or includes a toothed blade, and/or includes a row of pins, and/or includes a source of air directed at the web, and/or includes a source of vacuum in various embodiments.

The toothed blade is retractable in accordance with another embodiment.

The seal bars have a second sealing zone such that the weakening zone is adjacent and between the first and second sealing zones in another embodiment. The distance in the machine direction from center to center of the first and second sealing zones is less than about 0.01, 0.1; and 0.30 inches in other embodiments.

The first and second sealing zones include a plurality of independently controlled temperature zones capable of making side seals and tape seals, and/or include cartridge heaters with a plurality of heat zones, and/or include a source of air disposed to cool at least a portion of the first and second sealing zones, and/or include at least one port for directing heated air to the web, and/or include at least one of a source of ultrasonic energy, microwave energy, and/or of radiative heat in various embodiments.

A sealing blanket is disposed to hold the web against the rotary drum and may be made of polyester material with a silicone layer that contacts the web in other embodiments.

The rotary drum has an adjustable diameter in another embodiment.

According to a second aspect of the invention, a bag is made by receiving a web, forming a first seal on the web using a seal bar on a rotary drum, and forming a weakened area adjacent the first seal. The weakened area is formed during at least a portion of the time the first seal is being formed.

The weakened area is formed for less than the time the first seal is being formed, and formed for about half the time the first seal is being formed in various embodiments.

Forming a weakened area includes, forming a consistently weak line, and/or forming a perforation, and/or forming a line of weakness that varies in intensity, and/or separating adjoining bags, and/or applying a vacuum to the web, and/or directing air at the web in other embodiments.

Forming a perforation includes heating a wire, and/or using a heat film, and/or contacting the web with a toothed blade that may or may not be retracted after the perforation is formed; and/or contacting the web with a row of pins, and/or forming an auxiliary seal adjacent the perforation in various embodiments.

The wire has power applied thereto at an adjustable voltage, and/or that is pulsed in other embodiments.

A signal indicative of heat in the wire is monitored and the power applied is controlled in response thereto in various embodiments.

A second seal is formed such that the weakened area is adjacent and between the first and second seals in another embodiment. The distance from center to center of the first and second seals in the machine direction is less than about 0.50, 0.3, 0.1 and 0.01 inches in various embodiments.

The first and second seals have a plurality of independently controlled temperature zones, and/or are cooled, and/or are formed using ultrasonic energy, microwave energy, and/or radiative heat in various embodiments.

According to a third aspect of the invention a perforator for a rotary bag machine is an insert for a rotary drum including a weakening zone. It may or may not be retrofitted to existing machines.

Other principal features and advantages of the invention will become apparent to those skilled in the art upon review of the following drawings, the detailed description and the appended claims.

BRIEF DESCRIPTION OF THE DRAWINGS

FIG. 2 is rotary drum in accordance with the present invention;
FIG. 3 is an end view of a seal bar in accordance with the present invention;
FIG. 4 is a side view of a seal bar in accordance with the present invention;
FIG. 5 is an end view of a seal bar in accordance with the present invention;
FIG. 13 is an end view of a seal bar in accordance with the present invention;
FIG. 14 is a side view of a seal bar in accordance with the present invention;
FIG. 15 is a segment of a side view of a seal bar in accordance with the present invention.

Figure 1:
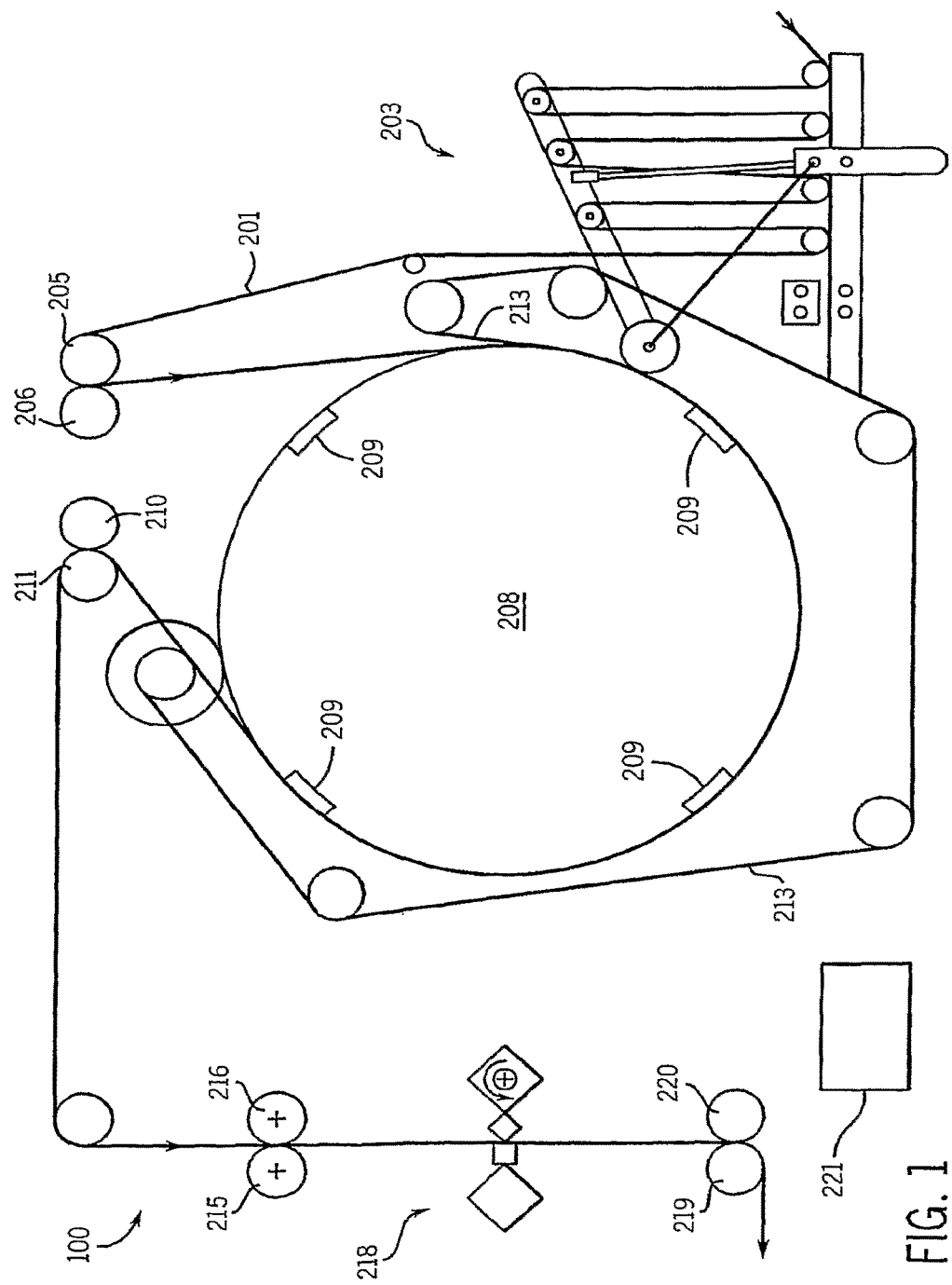
FIG. 1 is bag machine in accordance with the prior art.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular bag machine, it should be understood at the outset that the invention can also be implemented with other machines, and using other components. Bag machine, as used herein, includes a machine used to make bags such as draw tape bags, non-draw tape bags, and other bags. Any input section (unwinds and dancers, e.g.) and any output section (winders, folders, e.g.) may be used with the present invention.

Generally, the present invention provides for a rotary bag machine with an input section, a drum section, and an output section. A perforation or line of weakness is formed on the rotary drum, for at least part of the time the seal is being formed. For example, on a rotary bag machine the web might be in contact with the drum for about one-half of the drum cycle, and the perforator formed in one quarter of the drum cycle. The seal bar includes a sealing zone and applies heat as the drum rotates, thus forming the seal. Seal bars, as used herein, includes an assembly, such as on a rotary drum, that applies heat to and seals the web, and the mounting mechanisms, perforators, etc. Sealing zone, as used herein, includes the portion of a seal bar that creates the seal.

The seal bars can have independently controlled temperature zones, for example for applying more heat to a draw tape portion of a side seal. Independently controlled temperature zones, as used herein, includes temperature zones along a sealing zone that can be controlled or caused to be different temperatures.

A perforator or weakening zone can be mounted on the seal bar, for example as part of an insert. The weakening zone can create a perforation or weakened area as the seal is being formed. The perforation can be created with heat, radiation, or by mechanical contact. Weakening zone, as used herein, includes the portion of a seal bar that creates a weakened area. Weakened area, as used herein, includes an area on the web which is weakened, such as by a perforation or a portion of the web being melted or burned off.

The insert can alternatively include a separating zone for separating adjoining bags. This typically requires more heat than weakening or perforating. Separating zone, as used herein, includes the portion of a seal bar that separates adjoining bags.

If the bag is a side seal bag, made with a pair of seals, the perforator is preferably disposed adjacent and between the pair of sealing zones. Adjacent, as used herein, includes being mounted with or close to. Between the sealing zones, as used herein, means the region, on a single seal bar assembly, between two heated seal tips.

Thus, the perforation is located consistently and correctly next to the seal. Less film is wasted because the distance between the pair of side seals is less. While typical prior bag machines have one inch between side seals, the preferred embodiment provides about 0.5 inches, more preferably 0.3 inches, and most preferably as little as about 0.01 inches between side seals. About, as used herein, includes a magnitude being close enough to a given value to function substantially the same as if the magnitude were the given value.

The perforator replaces a downstream perforator that needed to be readjusted every few days with an insert that does not need readjusting, although it might need to be replaced (such as monthly). Insert, as used herein with reference to a seal bar, includes an assembly mounted on or with the seal bar that is in addition to the sealing zone that creates the seal or seals.

A wide variety of perforators can be used, such as a heating wire, heat film, toothed blades, etc. Heat film, as used herein, includes a film used to apply heat to a specific area. The perforation strength may be adjusted by controlling the amount of heat (or pressure) applied at the perforator. The perforation may be clearly defined, a line of weakness, or a line of weakness that varies in intensity. Line of weakness that varies in intensity, as used herein, includes varying web strength along a line or curve, such as a perforation or such as a line where the web is not removed, but alternates between low and higher strength regions.

Using a heated perforator can advantageously create an auxiliary sealed area at the edge of the perforation or line of weakness. Heated perforator, as used herein, includes a device that uses thermal energy to perforate, through contact, convection, conduction or radiative heat. Heating wire, as used herein, is a wire used to heat, such as by passing electrical current therethrough. Auxiliary sealed area, as used herein, includes a sealed area formed by forming a perforation using heat. The edges of the perforation may include a strip where the web is sealed. This is in addition to the web being sealed by a distinct sealing zone. Radiative heat, as used herein, includes heat in the form of electromagnetic radiation, ultrasonic radiation, thermal radiation, etc.

The heated perforator may include a wire in intermittent contact with the web, to create the perforation pattern. Intermittent contact between the web and a sealing or perforating element, as used herein, includes the web being in contact with the element at some locations and not in contact at other locations, such as contact and no contact alternations along a cross-machine direction line.

One embodiment provides for retrofitting existing machines by placing an insert on existing seal bars, or by replacing seal bars with seal bars designed to have a weakening zone, such as with an insert.

The blanket may be blankets such as those found in the prior art, although the preferred embodiment includes a blanket that is a Habisit® Silicone Belt, consisting of 2-ply polyester material with ⅛" ground silicone top cover with an endless length. Other blankets, preferably able to handle the high intermittent temperatures (600-800 F.) that can be reached while burning a perforation and that have good release characteristics so the film does not stick to the belting, are contemplated in various embodiments, and may be Teflon®), silicon, hybrids, etc.

Turning now to FIG. 2, a drum 200 consistent with the present invention is shown. Drum 200 includes four seal bars 229, and a blanket 230 that holds a web or film against drum 200 and seal bars 229. Drum 200 operates generally as the prior art drum, but seal bars 229 include a perforator.

Drum 200 is preferably one similar to the CMD 1270GDS Global Drawtape System® and has approximately 0.5 seconds of seal dwell time at 600 fpm and has an adjustable diameter to easily change product repeat lengths. It has 4 seal bars equally spaced around the circumference that span across a 50" web width. This drum can be used for making trash can liners or garbage bags, for example. Other drums could consist of more or less seal bars, larger or smaller diameter, or narrower or wider web widths.

Referring now to FIG. 3, an end view of a seal bar 229 is shown. Seal bar 229 extends the width of the drum, and includes two sealing zones 302 and 304, a cartridge heater 310, and a thermocouple 308. An insert 306 that includes a perforator is mounted on seal bar 300.

Seal bar 300 preferably has a uniform temperature range across a given width of a web, with an independently controlled temperature zone at the edge for making a side seal while simultaneously making a tape seal with bar 401. Cartridge heater 310 is a custom wound heat zone such as those available from Watlow® or Thermal Corp. in the preferred embodiment. The temperature profile for specific or different temperature setting combinations (desirable especially on thin films) may be controlled using compressed air cooling of hot zones, as described below. Air cooling is also used for isolating different temperature zones which are located next to each other but are set at greatly different temperatures such as 300 F. (bar 304) for side seals but 450 F. (bar 401) for tape seals, in various embodiments.

Referring now to FIG. 4, a side view of seal bar 229 is shown. Seal bar 229 includes, in the preferred embodiment, a first temperature zone 401 for a draw tape seal and a second temperature 402 for making a side seal. Temperature zone 402 may include multiple temperature zones 403, 404 and 405.

One alternative embodiment provides for seal bars that form side seals only, with no drawtape seal zone. Another embodiment, provides for a seal bar that makes a bottom seal with only one seal (the perforation preferably does not have an auxiliary seal in this embodiment). FIG. 5 is an end view of a seal bar 500 that has a single sealing zone 501 that makes a total burn-off cut to separate adjoining bags. A weakening zone may be mounted to seal bar 500 to form a weakened area. The weakening zone may be made as described herein with respect to side seal arrangements.

Figure 6:
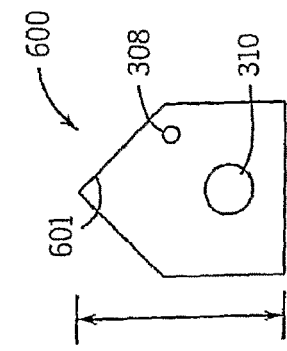
FIG. 6 is an end view of a seal bar in accordance with the present invention.
Figure 7:
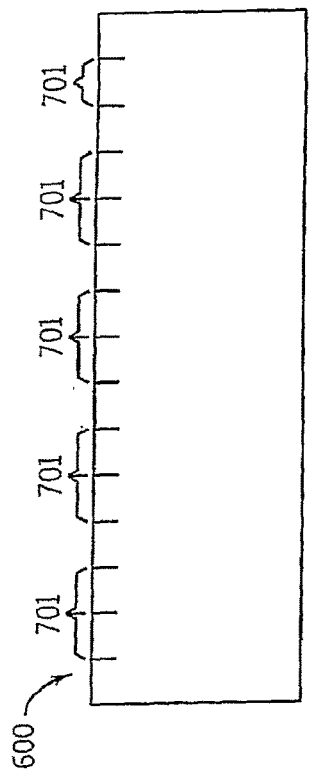
FIG. 7 is a side view of a seal bar in accordance with the present invention.

FIG. 6 (end view) and FIG. 7 (side view) show a seal bar 600 that has a single sealing zone 601 that makes a total burn-off cut with perforation notches 701 cut in the tip. The seal bars and heaters therein may be comprised of different material in various embodiments, such as a tubular heater cast in aluminum (available from Watlow®).

Figure 8:
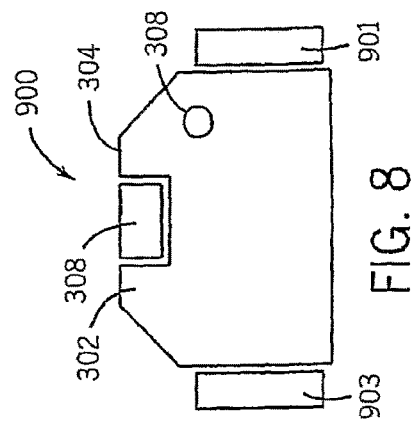
FIG. 8 is an end view of a seal bar in accordance with the present invention.
Figure 9:
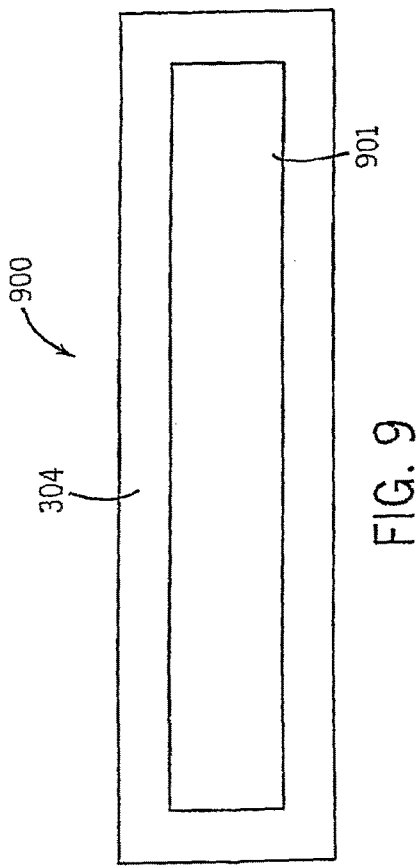
FIG. 9 is a side view of a seal bar in accordance with the present invention.

Cartridge heater 310 is replaced with a flexible silicone rubber heater 901 and 903, as shown in FIGS. 8 and 9, in another embodiment. Heaters 901 and 903 are held on the sides of an aluminum bar using pressure sensitive adhesive (available from Watlow®).

Figure 10:
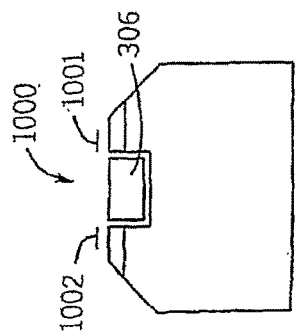
FIG. 10 is an end view of a seal bar in accordance with the present invention.
Figure 11:
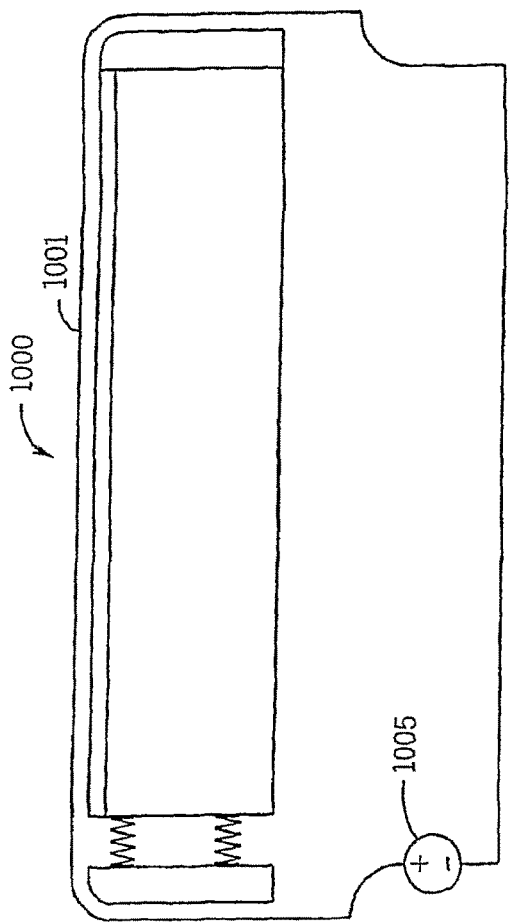
FIG. 11 is a side view of a seal bar in accordance with the present invention.

An alternative seal bar 1000 is shown in FIGS. 10 (end view) and 11 (side view). Seal bar 1000 includes nickel chromium resistance or heating wires (Ni—Cr wires) 1001 and 1002, connected to a DC or AC power supply 1005. The wires can be separate wires with separate power supplies, parallel wires, or series segments of a wire. Power to the wire may be on constantly, pulsed on and off, or have an otherwise varying power level. Proper timing of the pulses allows the seals to cool prior to where the web leaves the drum, for easier separation of the web from the seal bar.

Figure 12:
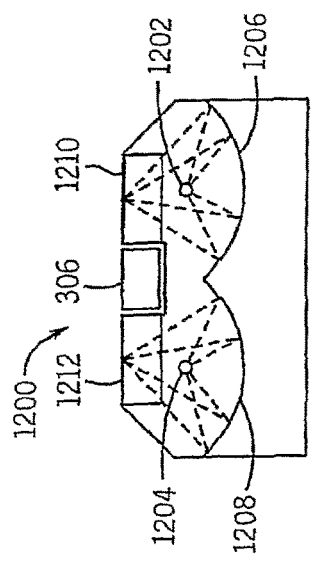
FIG. 12 is an end view of a seal bar in accordance with the present invention.

Another embodiment is seal bar 1200, shown in FIG. 12 (end view). Seal bar 1200 seals using focused infrared light, and includes light sources 1202 and 1204, reflectors 1206 and 1208, and glass strips 1210 and 1212. The surface of glass strips 1210 and 1212 are preferably coated with Teflon® or a similar release agent.

Laser or focused light directed with a moving or pivoting mirror or lens is used on other embodiments. The laser can be positioned in the center of drum 200, and a pivoting mirror (or a linear actuator) can be used to direct the laser light through a glass seal bar at the periphery of the drum (again, the glass can be coated for easier release). The seal bar can have a continuous line of glass for forming seals, and alternating intermittent regions of opaque and clear for creating perforations.

Another alternative seal bar 1300 is shown in FIG. 13 (end view) and FIG. 14 (side view). Seal bar 1300 uses compressed air provided through pipes 1301 and 1302. A plurality of ports 1305 terminate in a pair of grooves 1307 and 1308 in the surface of sealing zones 302 and 304. Other alternatives use ultrasonic, microwave, or radiation heating of the web.

Insert 306 has, in the preferred embodiment, a Ni—Cr wire woven into a shape that produces intermittent contact with the web. The Ni—Cr wire is pulsed on for the first half of the dwell time (the time the web is against the seal bar) and allowed to cool the second half of the dwell time so the perforations are non-molten when the web separates from the perforator. This allows a stronger web, reduces film sticking to the wire, and eliminates the chance of the perforation melting shut.

Referring now to FIG. 15, a side view of a segment of insert 306 is shown, and, in the preferred embodiment, is a 0.12 inch thick machinable glass-mica ceramic (available from McMaster/Carr) with a row of holes 1501, that are alternately spaced 0.25" and 0.12" apart, along the 50 inch length of insert 306. The holes have a diameter of 0.06 inches. A resistance or heating wire 1502 comprised of about 80% nickel and 20% chromium, 0.013" diameter, 4 ohms/ft, annealed soft (available from Pelican Wire Co.), is woven through the pattern of holes such that the greater length is on the web facing surfacing top, and the shorter length (between holes) is on the opposite surface. Wire 1502 is flattened to lay against the mica, and the holes are rounded to reduce wire stress. High temperature (650 degree F.) flexible silicone caulk is applied to fill holes and air gaps around the wire (available from NAPA 765-1203 PTEX HI-T). This reduces wire hot spots and allows wire 1502 to expand and contract each cycle. The preferred embodiment uses a woven design to reduce the need for large wire tensioners that would be used in alternative designs because a 50" long wire would expand 0.38" every cycle. A glass mica layer 0.03 inches thick (not shown) is applied to the bottom (the side not facing the web) of insert 306 to insulate the wire from the aluminum housing. Preferably insert 306 is sized to fit into existing seal bar designs. An adjustable DC or AC power source provides a pulse of power for the first half of the dwell time in the preferred embodiment.

Figure 16:
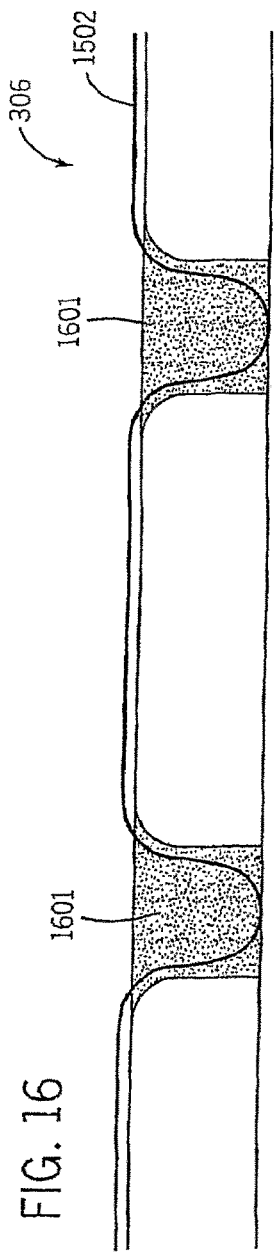
FIG. 16 is a segment of a side view of a seal bar in accordance with the present invention.

One alternative designs is shown in FIG. 16, where insert 306 has wire 1502 pushed into a series of cavities in the mica glass insert 306. The cavities extend the 50 inch length of insert 306, and are disposed every 0.25 inches, with a 0.12 inch diameter. The cavities are filled with flexible silicone caulk.

Figure 26:
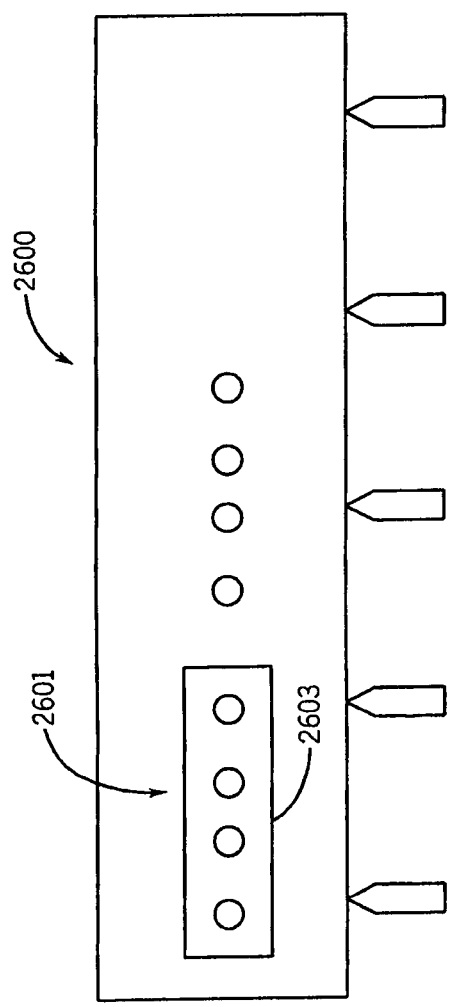
FIG. 26 is a part of an insert in accordance with the present invention.

Another embodiment of the invention includes an insert 2600, shown in FIG. 26, and includes a separate heat zone 2601, such as for heating a draw tape region. Various embodiments provide for region 2601 to be used with or without a perforation that extends across the film (the perforation could cross a drawtape, and the seal could extend the width of the film, e.g.). Within region 2601, a 0.020 in. mica layer (or a Glastherm HT® layer) 2603 is provided. A NiCr wire is disposed in a series of cavities or holes (as in FIG. 16). The holes are located every 0.312 inches, and have a 0.030 in. diameter in region 2601. The insert is 0.25 inches wide, and the seals (between which the perforation is made) are 0.5 inches apart.

Figure 27:
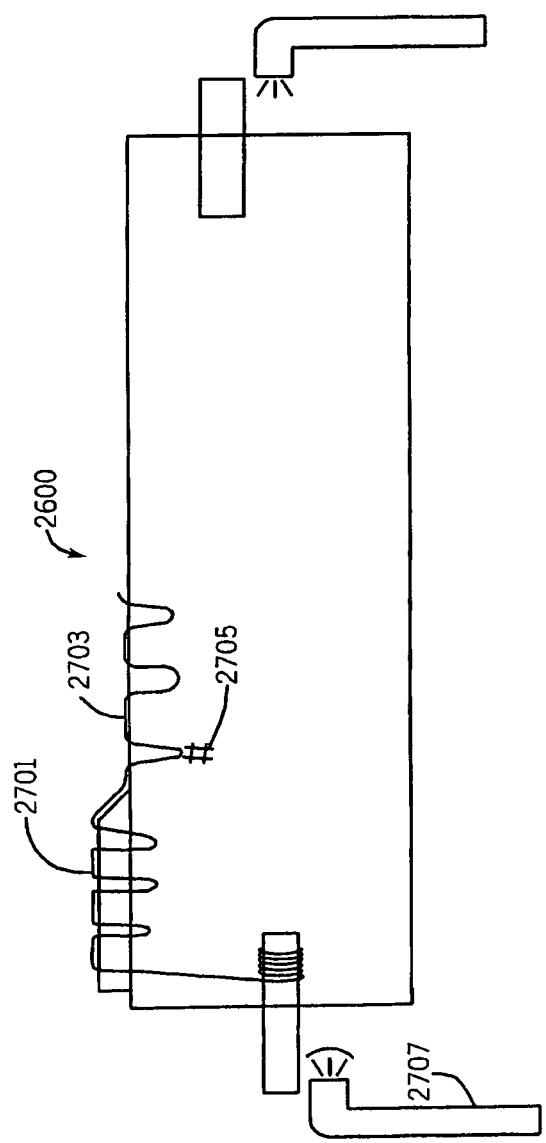
FIG. 27 is a side view of the insert of FIG. 26.

The side view of insert 2600, shown in FIG. 27, shows a NiCr wire 2701 disposed in the holes in region 2601. The wire preferably has a 0.0089 in. diameter in region 2601. Wire 2701 is serially connected to a 0.0126 NiCr wire 2703 (using a crimp 2705). The larger wire requires larger holes (0.062 in. in the preferred embodiment). The wire sizes can be chosen to select the wire resistance, and thus the heat provided. Wire 2703 is soldered to and/or wrapped around a preferably silver pin to be connected to a high temperature wire 2707.

The NiCr wire may be turned on and off (current flow) to control temperature of the wire/sealing. For example, the wire may be turned on immediately after contacting the film (or blanket), and turned off immediately after the contact with the film (or blanket) ends. Alternatives include connections other than serial between wires 2701 and 2703, more heat zones (and wire connections/types), controlling heat with external resistors/potentiometers or current magnitude, such as with PWM. If a pot is used the user could adjust the relative temperature by adjusting the pot. Other embodiments includes combining these features, or other on/off schemes. This and other embodiments may be used with any other bag where a perforation needs to be placed next to a seal, such as t-shirt bags, including reinforced t-shirt bags, draw tape bags, side seal bags, etc.

The blanket preferably has a 0.05-0.012 in. thick silicone rubber top surface with a matte finish, durometer 70-90 Shore A, initially seasoned with a talc powder. The wire may be held in the holes using a Resbond® high temperature adhesive, injected into the holes using a syringe. Hard or flexible adhesives, or both, alternating, e.g.) may be used. Flexible adhesives allow the wire to flex, which can occur when it is heated and cooled. The insert may be held in place with five cone point set screws.

Figure 17:
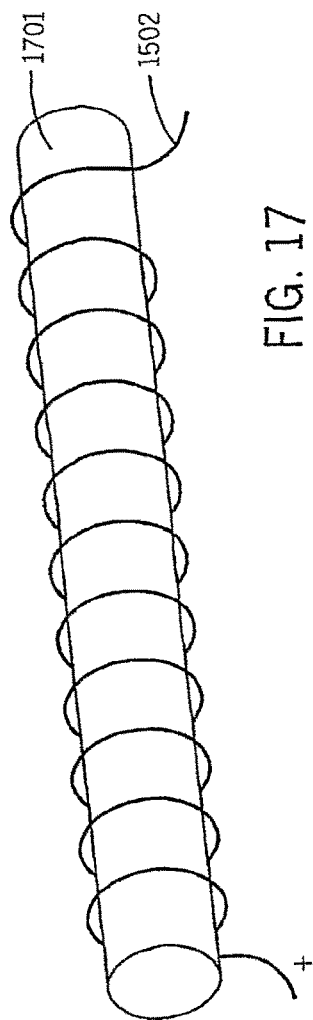
FIG. 17 is a part of an insert in accordance with the present invention.
Figure 18:
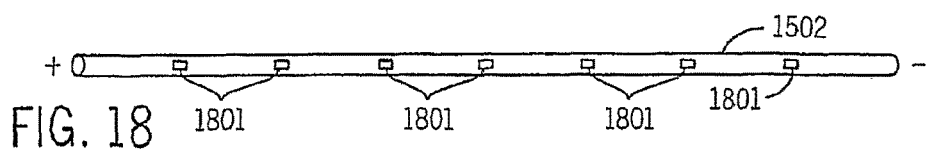
FIG. 18 is a part of an insert in accordance with the present invention.

Another alternative is shown in FIG. 17, where wire 1502 is spirally wound about a 0.06" ceramic rod 1701 and bonded with flexible silicone caulk, everywhere except where wire 1502 touches the web.

Figure 19:
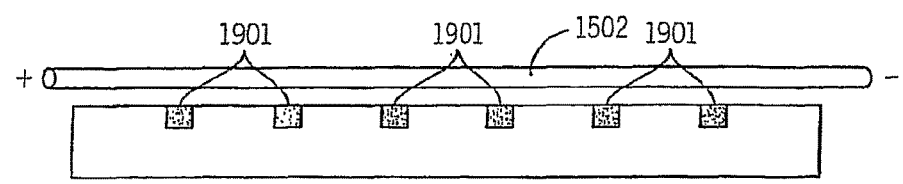
FIG. 19 is a part of an insert in accordance with the present invention.
Figure 20:
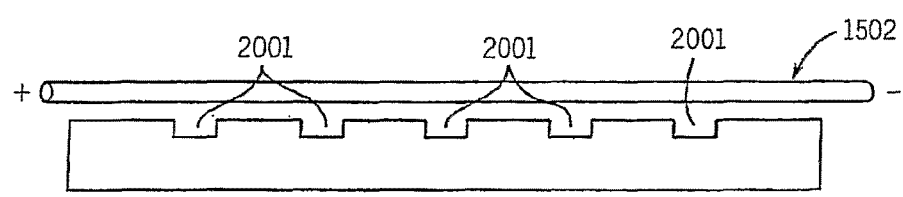
FIG. 20 is a part of an insert in accordance with the present invention.
Figure 21:
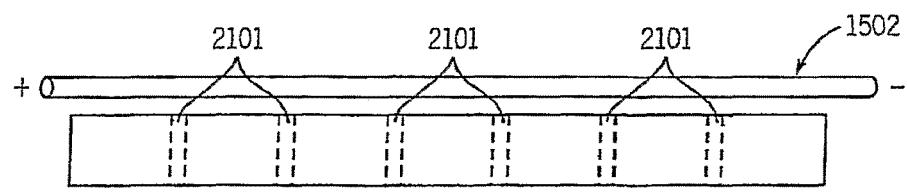
FIG. 21 is a part of an insert in accordance with the present invention.
Figure 22:
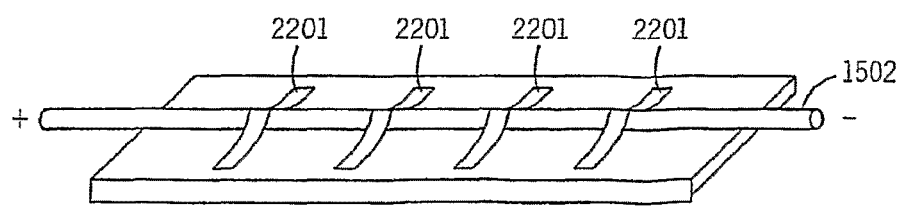
FIG. 22 is a part of an insert in accordance with the present invention.

Other alternatives are shown in FIGS. 18-22 and include a straight wire 1502 across the width of the web but making cold spots on wire 1502 with copper coated portions 1801. FIG. 19 shows a design where cold spots are created with areas 1901 of backing materials of different heat conduction rate. FIG. 20 shows a design where cold spots are created with notched recesses 2001. FIG. 21 shows a design where cold spots are created with air cooling of intermittent spots through ports 2101. FIG. 22 shows a design where cold spots are created with thin straps 2201 over wire 1502.

Other alternatives provide for wire 1502 to be round, a rectangular ribbon, straight or woven at a uniform or varying pitch, uniform thickness or non-uniform thickness along their length (to create hot/cold spots), Toss® wire, tapered, or profiled to make two side seals between a burn off cut. Profiled wire may have intermittent copper plating to perforate rather than clean cut. Varying pitch for a woven wire or different hole spacing creates a weakened area of varying weakness, that allows the bag to be torn by hand easier at the edge than in the middle of the web. Other designs contemplated include flexible silicone rubber heaters, thick film heating technology, sintered ceramic, or the like available from Watlow Electric Manufacturing Co. Yet other alternatives include using thin film heating technology mounted on a PNEUSEAL™ rubber inflatable diaphragm that can stay hot all the time but physically move in and out of contact with the film by inflating and deflating the diaphragm.

Other alternatives includes a wire that is constantly hot but is physically moved in and out of contact with the web during the seal dwell phase. Hot wire segments (stitches) could be connected to a power source in parallel or in series. Parallel is preferred to reduce the amount of current required. Hot wires are preferably potted into a replaceable insert that can be easily replaced in the field and mass produced. Hot wires could be coated with substance to improve release characteristics.

Figure 23:
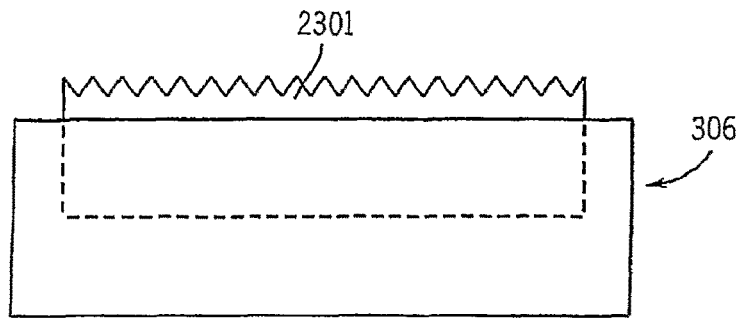
FIG. 23 is a part of an insert in accordance with the present invention.

Alternative perforators include a toothed blade 2301 (see FIG. 23) that penetrates the sealing blanket. In one embodiment the sealing blanket is kept in phase with the perforator to avoid damage to the blanket in the area where seals occur. The toothed blade may be extended all the time or extend and retract each cycle (driven by spring, pneumatics, or cam). One alternative is to use a row of pins rather than a row of teeth. A vacuum chamber is preferably used to suck the film onto a row of pins so the pins do not need to penetrate the blanket. The knife backing material may be a silicone blanket, Teflon® blanket, silicone roller, brush roller, short section of silicone belting, or a series of soft rollers. The knife may perforate prior to the seal dwell area.

Figure 24:
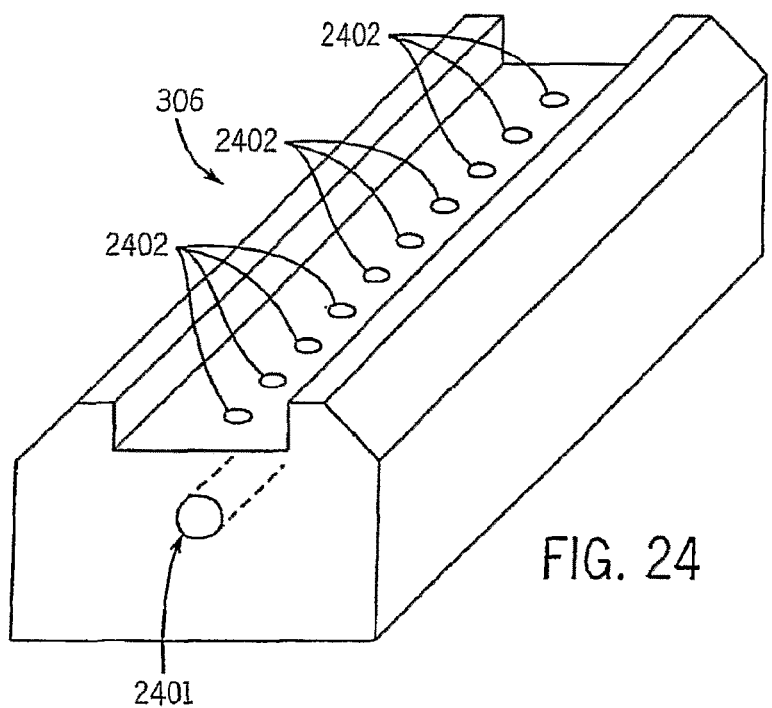
FIG. 24 is a perspective view of a seal bar in accordance with the present invention.

Another alternative is to use hot compressed air jets 2402 (FIG. 24) that receive air from a pipe 2401, and are disposed in an array to melt and blow a row of hole perforations. The air source is cold in one embodiment, and the air is heated by focused infrared light, radiation, convection, or conduction. Other alternatives includes sucking the film onto or over a sharp object, projecting a small solid particle or liquid particle at the web to create a hole or pattern of holes, a linear notched rotary "pizza cutter" blade moving across web cutting against a sealing belt or metal belt/band, a straight edge knife mounted in or next to the seal bar provided with a fixed anvil outside the drum used as a shear cut or a flex blade type knife assembly.

The preferred embodiment controls the heat of a burn-perf wire by controlling the voltage of a DC circuit. Preferably the lowest voltage that provides an acceptable perforation is used. For example, a 0.013" diameter 80/20 Ni—Cr wire woven alternating between 0.25 inch in contact with the web and 0.12 inches below the mica requires approximately 20 watts per inch of web width to burn perforations in 0.75 mil LLDPE film two layers thick at 600 feet per minute. Thus, a 2 inch long perforator would use 10 volts pulsed on for about 0.25 seconds as soon as the film is sandwiched between the perforator and the seal blanket. With a 0.5 second dwell time, the perforation has about 0.25 seconds to cool. The preferred embodiment thus allows the perforation to be quickly heated and cool down. The adjustable voltage is supplied by a DC motor controller in the preferred embodiment. Other embodiments includes a mechanical rheostat, potentiometer, or adjustable resistor. An adjustable AC voltage can alternatively be used.

A controller may be used to compensate for resistance changes over the life of the wire. For example, a Toss® controller has current sensing feedback and adjusts voltage accordingly to maintain a more consistent temperature. Cartridge heaters may be controlled with thermocouple feedback using PID temperature control, as is well known in the industry.

The preferred embodiment provides for consistent incoming tension and consistent incoming accumulation to consistently form seals and perforations. The preferred embodiment includes a servo infeed nip with ultrasonic accumulation loop feedback. Alternatives includes a mechanical lay-on roll assembly. Static induction pinning is used to help the film lay flat against the sealing blanket.

A tension zone isolator nip, also called a chill roll nip., is used as the web exits the sealing drum area. The preferred embodiment uses a 2" wide double groove diamond shape is cut into the face of the roll to allow minor air bubbles or wrinkles to flush out rather than build up ahead of the nip.

After leaving the drum the web is provided to folding boards. Hard-board filler plates with ¼ diameter holes 3" from the tip of standard V-board with symmetrical geometry near the tip of the V-board are provided to reduce tension surges due to wrinkles or air entrapment. Also, transporting the folded web over two idlers before going through a rubber nip and an additional ¼ thick air relief blade is inserted between film layers just prior to the rubber nip to allow air to bleed out rather than getting trapped inside wrinkles.

Figure 25:
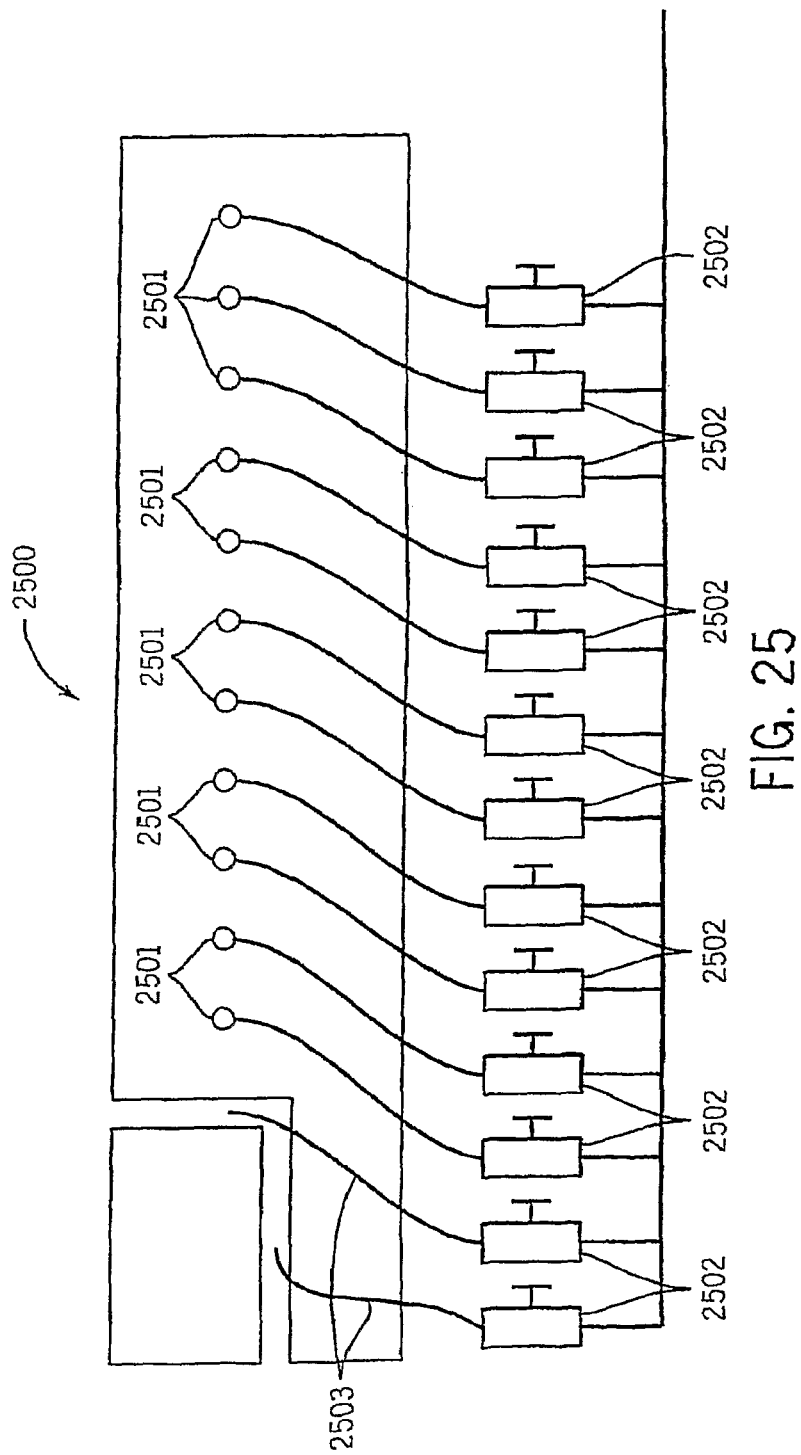
FIG. 25 is a side view of a seal bar in accordance with the present invention.

Air cooling of hot zones, briefly referred to above, generally includes ports or channels in seal bar, for example created by drilling or machining, to allow compressed air to flow through a desired zone or zones. FIG. 25 shows seal bar 229 with a plurality of ports 2501 and a plurality of valves 2502. Thus, the amount of compressed air that flows through each zone is controlled by valves 2502. Air cooling could also be used for isolating different temperature zones which are located right next to each other but are set at greatly different temperatures such as 300 F. for side seals but 450 F. for tape seals. As with many feature disclosed herein, the air cooling can be practiced without practicing other features of the invention, such as without insert 306.

Figure 28:
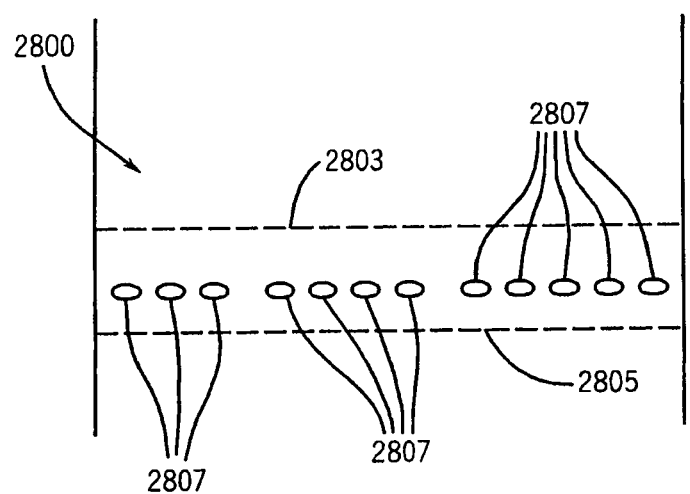
FIG. 28 is a seal and weakened zone in accordance with the present invention.

Another embodiment provides for using a single seal bar, with a perforation within the seal. Referring now to FIG. 28, a seal zone 2800 is delineated by dashed lines 2803 and 2805 (the lines do not appear on the actual product, but indicate where the sealed zone ends). The seal bar can include a wire, such as in the embodiments described above, that creates holes 2807, extending across the film, and creating a weakened zone. The holes may be linear, or randomly placed. In either case, a seal that includes a perforation is formed. Adjacent bags may be separated along the seal by tearing. The perforation may be a line, or though out the sealed zone. Other embodiments include simply creating a perforation (without the seal, or with partial seals), on the drum.

The single seal/perforation may be created using a contoured seal bar, a previous embodiment with the temperature controlled to burn through in places, fine fabric impression (bumpy or textured) blanket, such as a Habasit®) WBVT-136 silcone rubber blanket, where the pressure of the "bumps" burns through the plastic.

Another embodiment provides for the seal and perforation to be formed together on a non-circular loop, such as an oval or oblong, or on a shuttle machine. generally, the invention of these embodiments call for the creation of a seal when and where a perforation is created.

Numerous modifications may be made to the present invention which still fall within the intended scope hereof. Thus, it should be apparent that there has been provided in accordance with the present invention a method and apparatus for making bags that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A bag machine, comprising:
an input section;
a rotary drum, disposed to receive a web from the input section, wherein the rotary drum includes at least one seal bar; and
an output section, disposed to receive the web from the rotary drum;
wherein the at least one seal bar includes a first sealing zone, and further includes a weakening zone adjacent the first sealing zone; and
wherein the weakening zone is a heated perforator that includes a heating wire that is disposed to make intermittent contact with the web when the web is threaded into the bag machine, wherein the intermittent contact includes contact and no contact alternations along a cross-machine direction line.

2. The bag machine of claim 1, further comprising a source of power at an adjustable voltage connected to the heating wire.

3. The bag machine of claim 2, further comprising a feedback loop connected to the heating wire and the source of power.

4. The bag machine of claim 1, further comprising a source of pulsed power connected to the heating wire.

5. The bag machine of claim 1, wherein the heating wire is a nickel chromium resistance wire.

6. The bag machine of claim 1, wherein the heating wire is disposed in an insert disposed adjacent the first sealing zone.

7. The bag machine of claim 6, wherein the insert is comprised of glass mica and has a plurality of holes disposed along a line in the cross direction.

8. The bag machine of claim 7, wherein the heating wire is comprised of about 80% nickel and about 20% chromium, and has a resistance of about 4 ohms/ft.

9. The bag machine of claim 1, wherein the weakening zone is disposed to create a line of weakness that varies in intensity.

10. The bag machine of claim 1, wherein the weakening zone is a separating zone.

11. The bag machine of claim 1, further comprising an adjustable source of power connected to the heating wire.

12. The bag machine of claim 1, wherein the heated perforator is disposed to create an auxiliary sealed area adjacent a perforation.

13. The bag machine of claim 1, wherein the at least one seal bar further includes a second sealing zone, disposed such that the weakening zone is adjacent and between the first and second sealing zones.

14. The bag machine of claim 13, wherein the distance in the machine direction from center to center of the first and second sealing zones is less than about 01.inches.

15. The bag machine of claim 13, wherein the distance in the machine direction from center to center of the first and second sealing zones is less than about 0.30 inches.

16. The bag machine of claim 13 wherein the first and second sealing zones include a plurality of independently controlled temperature zones capable of making side seals and tape seals.

17. The bag machine of claim 13 wherein the first and second sealing zones bar include cartridge heaters with a plurality of heat zones.

18. The bag machine of claim 13 further comprising a source of air disposed to cool at least a portion of the first and second sealing zones.

19. The bag machine of claim 13, wherein the first and second sealing zones includes at least one port for directing heated air to the web.

20. The bag machine of claim 13, wherein the first and second sealing zones include at least one of a source of ultrasonic energy, a source of microwave energy, and a source of radiative heat.

21. The bag machine of claim 1, further comprising a sealing blanket disposed to hold the web against the rotary drum and comprised of polyester material with a silicone layer that is disposed to contact the web.

* * * * *